United States Patent
Hasegawa

(10) Patent No.: US 8,280,110 B2
(45) Date of Patent: Oct. 2, 2012

(54) STATE ESTIMATING APPARATUS AND STATE ESTIMATING PROGRAM

(75) Inventor: Tadaaki Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 336 days.

(21) Appl. No.: 12/475,779

(22) Filed: Jun. 1, 2009

(65) Prior Publication Data

US 2009/0306949 A1 Dec. 10, 2009

(30) Foreign Application Priority Data

Jun. 9, 2008 (JP) .................................. 2008-150473

(51) Int. Cl.
*G06K 9/00* (2006.01)

(52) U.S. Cl. ........................................ 382/103; 382/181

(58) Field of Classification Search .................. 382/103, 382/181

See application file for complete search history.

(56) References Cited

U.S. PATENT DOCUMENTS

| 7,929,730 B2 * | 4/2011 | Huang et al. ................... 382/103 |
| 2003/0219146 A1 * | 11/2003 | Jepson et al. .................. 382/103 |
| 2010/0067803 A1 * | 3/2010 | Huang et al. ................... 382/195 |

FOREIGN PATENT DOCUMENTS

JP 2007-328746 12/2007

OTHER PUBLICATIONS

Zheng et al. "Object Detection and tracking using Bayes-Constrained Particle Swarm Optimization", Chapter 9, Computer Vision Rsearch Progress, Nov. 2007, 16 pages.*

* cited by examiner

*Primary Examiner* — Suzanne Lo
(74) *Attorney, Agent, or Firm* — Rankin, Hill & Clark LLP

(57) ABSTRACT

A state estimating apparatus permits efficient, highly accurate estimation of the state of an object. A particle in a state variable space defined by a second state variable preferentially remains or increases as the likelihood thereof relative to a current measured value of a first state variable is higher, while a particle is preferentially extinguished as the likelihood thereof is lower. A particle which transitions in the state variable space according to a state transition model with a high probability of being followed by an object (a high-likelihood model) as a next model tends to increase. On the other hand, although in a small quantity, there are particles having models (low-likelihood models) which are different from the high-likelihood model as their unique models.

6 Claims, 6 Drawing Sheets

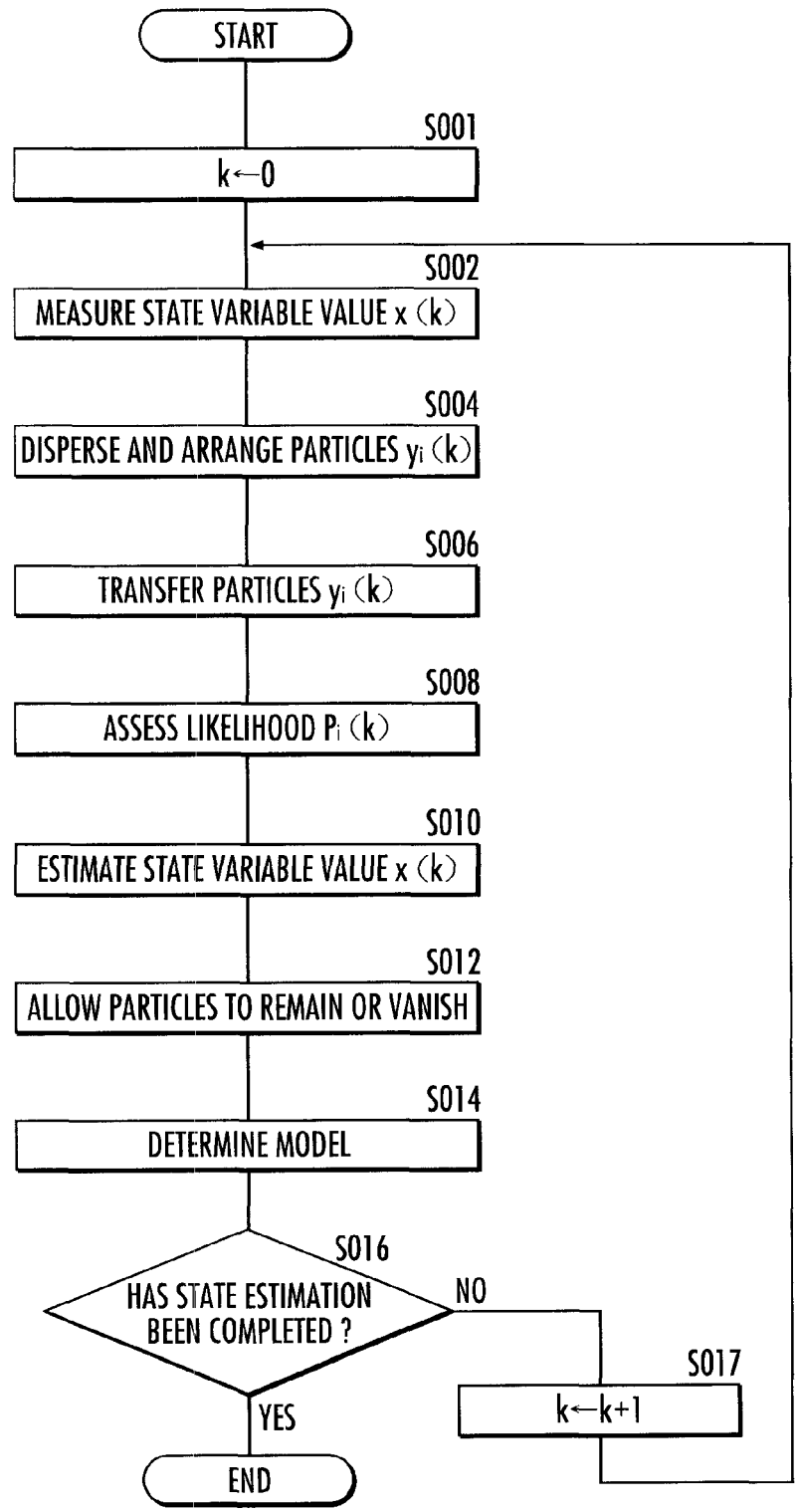

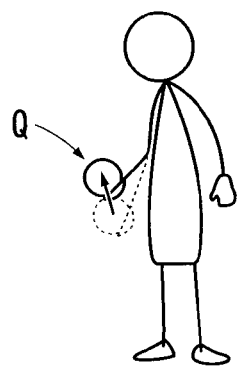
FIG.3 (a) TIME k
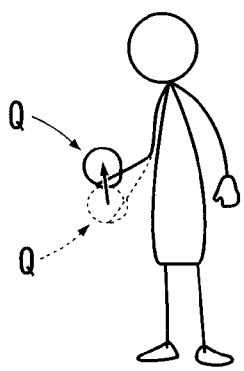
FIG.3 (b) TIME k+1
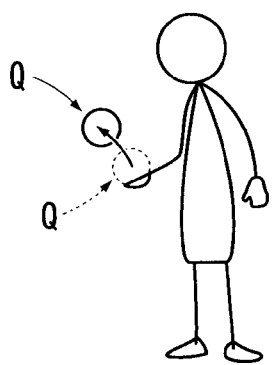
FIG.3 (c) TIME k+2

STATE ESTIMATING APPARATUS AND STATE ESTIMATING PROGRAM

BACKGROUND OF THE INVENTION

1. Field of the Invention

The present invention relates mainly to an apparatus which estimates the state of an object by using a particle filter.

2. Description of the Related Art

In order to improve the accuracy of tracking an object by using a particle filter, there has been proposed a technique in which a plurality of motion models, each of which matches each of a plurality of motion characteristics of the object, is prepared for an entire set of particles, and these plural motion models are adaptively changed (refer to Japanese Patent Application Laid-Open No. 2007-328746).

However, each particle is displaced according to each of the plurality of models corresponding thereto at each particular time, and then the likelihood relative to an observation result is calculated to select one model owned by a group of particles having a higher likelihood among the plurality of models, thereby tracking the object. In other words, the same number of likelihoods relative to the observation results as the number obtained by multiplying the number of particles by the number of models at each particular time is calculated. This is inefficient, because the arithmetic processing volume required for tracking the object inevitably becomes enormous. On the other hand, if the number of particles is decreased to reduce the arithmetic processing volume, then the object tracking accuracy is likely to deteriorate.

SUMMARY OF THE INVENTION

The present invention, therefore, has been made with a view toward solving the above problem, and it is an object thereof to provide mainly an apparatus capable of efficiently estimating the state of an object with high accuracy.

To this end, a state estimating apparatus according to a first aspect of the invention includes a first element which measures the value of a first state variable indicative of the state of an object, disperses at least some particles among a plurality of particles around previous positions in a state variable space defined by a second state variable, transits each of the plurality of particles to a current position according to a current model, which is unique to each particle and which fluidly changes, among a plurality of models, assesses the likelihood of the each particle relative to a current measured value of the first state variable, and estimates the current state of the object on the basis of the likelihood; and a second element which preferentially allows the particle which has been assessed by the first element and the likelihood of which is high to exist or increase, whereas preferentially extinguishes the particle which has been assessed by the first element and the likelihood of which is low, then determines a next model unique to the each particle on the basis of the current model unique to the each particle.

According to the state estimating apparatus in accordance with the first aspect of the invention, in a state variable space defined by a second state variable, the state of an object is estimated by (1) transferring each particle to a current position according to a current model unique thereto, and then (2) assessing the likelihood of each particle relative to a current measured value of a first state variable. This reduces the arithmetic processing load on the apparatus required to estimate an object, as compared with a case where (1') each particle transitions according to each of a plurality of models, and (2') the likelihood of each particle relative to a measured value of the first state variable is assessed. The first state variable and the second state variable may be the same or different. The second state variable may be different from the first state variable and may be a hidden variable, which is not measured.

Further, a particle with higher likelihood relative to a current measured value of the first state variable preferentially exists or increases, while a particle with lower likelihood preferentially extinguishes. Hence, particles transferred in the state variable space according to state transition models with high probability that the object is following (hereinafter referred to as "models with high likelihood," as appropriate) tend to gradually increase. Further, a next model is determined on the basis of a current model unique to a particle. Hence, a particle transferred in the state variable space having a high likelihood model as the next model tends to increase. On the other hand, models fluidly change, thus leaving an allowance for a different model from a current model to be determined as the next model, while the current model remaining as the basis.

Thus, although in a small quantity, there are particles using models which are different from high-likelihood models (hereinafter referred to as "low-likelihood models," as appropriate) as the models unique thereto in order to provide a brake against the increase of the particles having high-likelihood models as the models unique thereto. With this arrangement, even if the object starts state transition according to a model which is different from a previous model, the state of the object can be estimated with high accuracy by flexibly responding to a change of the model by changing a past low-likelihood model to a future high-likelihood model. This means that the state of the object can be efficiently estimated with high accuracy.

According to a state estimating apparatus in accordance with a second aspect of the invention, in the state estimating apparatus according to the first aspect of the invention, the second element determines a current model unique to the particle according to a region to which a current value of a model variable, which is unique to the each particle and which fluidly changes, belongs among a plurality of regions, defined in correspondence with the plurality of models, respectively.

The state estimating apparatus according to the second aspect of the invention makes it possible to fluidly change the model unique to each particle by fluidly changing the value of a model variable unique to each particle. Thus, as described above, even if the object starts state transition according to a model which is different from a previous model, the state of the object can be efficiently estimated with high accuracy by flexibly responding to the change of the model by changing a past low-likelihood model to a future high-likelihood model.

According to a state estimating apparatus in accordance with a third aspect of the invention, in the state estimating apparatus according to the second aspect of the invention, the second element changes the next value such that the perturbation amount from a current value to a next value of the model variable falls within a permissible range, and determines a next model unique to the particle on the basis of a region to which the next value belongs.

According to the state estimating apparatus in accordance with the third aspect of the invention, perturbating the value of a model variable allows a current model to be determined so that a previous model unique to a particle that has remained by controlling the perturbation amount of the value to a permissible range is inherited to a certain extent, while leaving an allowance for a different model from the previous model to be determined as the current model. This arrangement makes it possible to estimate the state of the object with high accuracy while respecting the situation in which the probability of the object changing the state thereof following a high-likelihood model.

According to a state estimating apparatus in accordance with a fourth aspect of the invention, in the state estimating apparatus according to the first aspect of the invention, the first element estimates a current model unique to a particle, the likelihood of which becomes a maximum, or a current model common to particles, the total sum of the likelihoods of which becomes a maximum, as a previous state transition model of the object.

According to the state estimating apparatus in accordance with the fourth aspect of the invention, the current model unique to a particle whose likelihood becomes a maximum is estimated as the previous state transition model of the object. Alternatively, the current model common to particles, the total of likelihoods of which becomes a maximum, is estimated as the previous state transition model of the object, taking into account that a particle tends to increase as the likelihood thereof is higher, as described above.

According to a state estimating apparatus in accordance with a fifth aspect of the invention, in the state estimating apparatus according to the first aspect of the invention, the first element estimates a weighted mean value, which uses the likelihood of the current position of the each particle as the weight, as the current value of the second state variable of the object.

According to the state estimating apparatus in accordance with the fifth aspect of the invention, the weighted mean value of the current position of a particle, which uses the likelihood as the weight, is estimated as the current value of a second state variable. Thus, it is estimated that the object is in a state wherein the object is defined by an estimated value of the second state variable.

A state estimating program in accordance with a sixth aspect of the invention causes a computer to function as the state estimating apparatus in accordance with the first aspect of the invention.

According to the state estimating program in accordance with the sixth aspect of the invention, a computer can be functioned as an apparatus for efficiently estimating the state of an object with high accuracy.

BRIEF DESCRIPTION OF THE DRAWINGS

FIG. 2 is a flowchart illustrating functions of the state estimating apparatus in accordance with the present invention;

FIG. 3 is a graphical illustration related to the observation of an object;

DESCRIPTION OF THE PREFERRED EMBODIMENTS

An embodiment of the state estimating apparatus in accordance with the present invention will be described with reference to the accompanying drawings.

Figure 1:
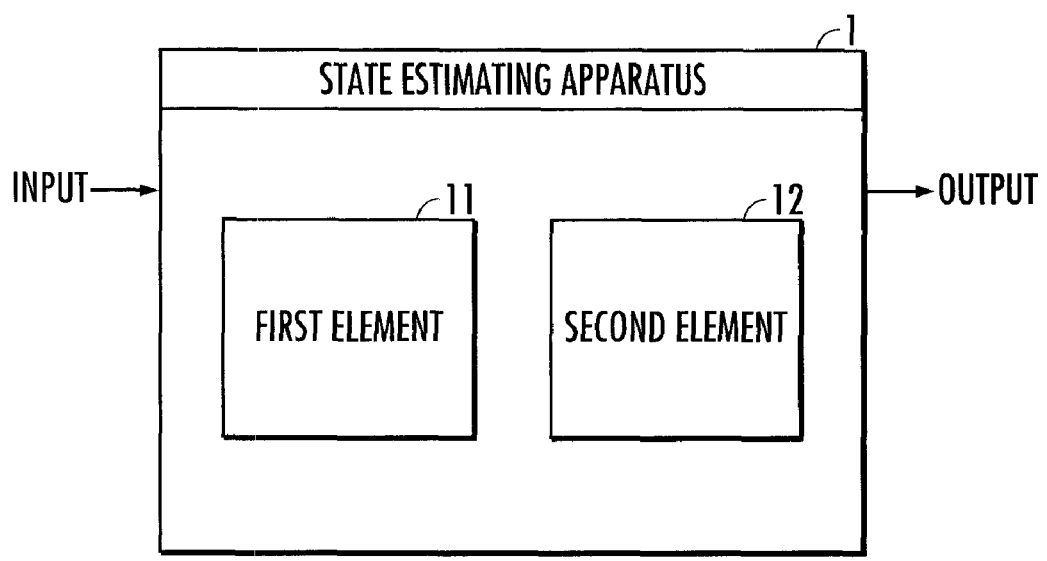
FIG. 1 is a graphical illustration related to the construction of a state estimating apparatus in accordance with the present invention.

First, the construction of the state estimating apparatus in accordance with the present invention will be described. A state estimating apparatus 1 illustrated in FIG. 1 is constituted of a computer, which primarily includes a CPU, a ROM, a RAM, I/O, and other electronic circuits. A memory of the computer stores a state estimating program for the computer to function as the state estimating apparatus 1. The state estimating program is read by the CPU from the memory and arithmetic processing is carried out according to the program.

The state estimating apparatus 1 has a first element 11 and a second element 12. Each of the first element 11 and the second element 12 is physically constituted of a memory and an arithmetic processor (CPU) which reads a program from the memory and carries out arithmetic processing for which it is responsible.

The first element 11 measures a first state variable value indicative of the state of an object. The first element 11 disperses at least some particles among a plurality of particles around previous positions in a state variable space defined by a second state variable. The first element 11 transits each of the plurality of particles to a current position according to a current model which is unique thereto and which fluidly changes among a plurality of models. The first element 11 assesses the likelihood of each particle relative to a current measured value of a first state variable to estimate the current state of the object on the basis of the likelihood.

The second element 12 allows a particle whose likelihood assessed by the first element 11 is high to preferentially remain or increase, while allowing a particle whose likelihood assessed by the first element 11 is low to preferentially extinguish. Thereafter, the second element 12 determines the next model unique to each particle on the basis of a current model unique to each particle.

The function of the state estimating apparatus 1 having the aforesaid construction will be described. A case will be considered where the position of a ball Q (hereinafter referred to as "the object position") is estimated as the value of a second state variable in a situation wherein the ball (object) Q in a hand of a human being is moved as the human being moves at time k as illustrated in FIG. 3 (a), the ball Q is about to leave the hand at time k+1 as illustrated in FIG. 3 (b), and the ball Q has Left the hand at time k+2 as illustrated in FIG. 3 (c), "k" denoting the number of repeated cycles of the arithmetic processing carried out by the state estimating apparatus 1.

A model in which the object position changes in a state wherein no gravity is acting on the ball Q is defined as a first model while a model in which the object position changes in a state wherein gravity is acting on the ball Q is defined as a second model. Hereinafter, a particle to which the first model has been assigned as its unique model will be referred to as a first-class particle, while a particle to which the second model has been assigned as its unique model will be referred to as a second-class particle.

First, an index k denoting an arithmetic processing cycle or time is reset (S001 in FIG. 2), an image taken by an imaging device, such as a CCD camera, is input to the state estimating apparatus 1, and an object position x (k) at time k is measured as a first state variable by the first element 11 on the basis of the input image (S002 in FIG. 2).

Further, a plurality of particles $y_i(k)$ (i=1, 2, . . . ) is dispersed and arranged in a state variable space by the second element 12 (S004 in FIG. 2). Except for an initial state (k=0), some of the plurality of particles $y_i(k)$ are dispersed around a previous position in the state variable space according to normal distribution or Gaussian distribution. Thus, as conceptually illustrated in FIG. 4, the first-class particles denoted by black circles and the second-class particles denoted by white circles are arranged in the state variable space.

Figure 5:
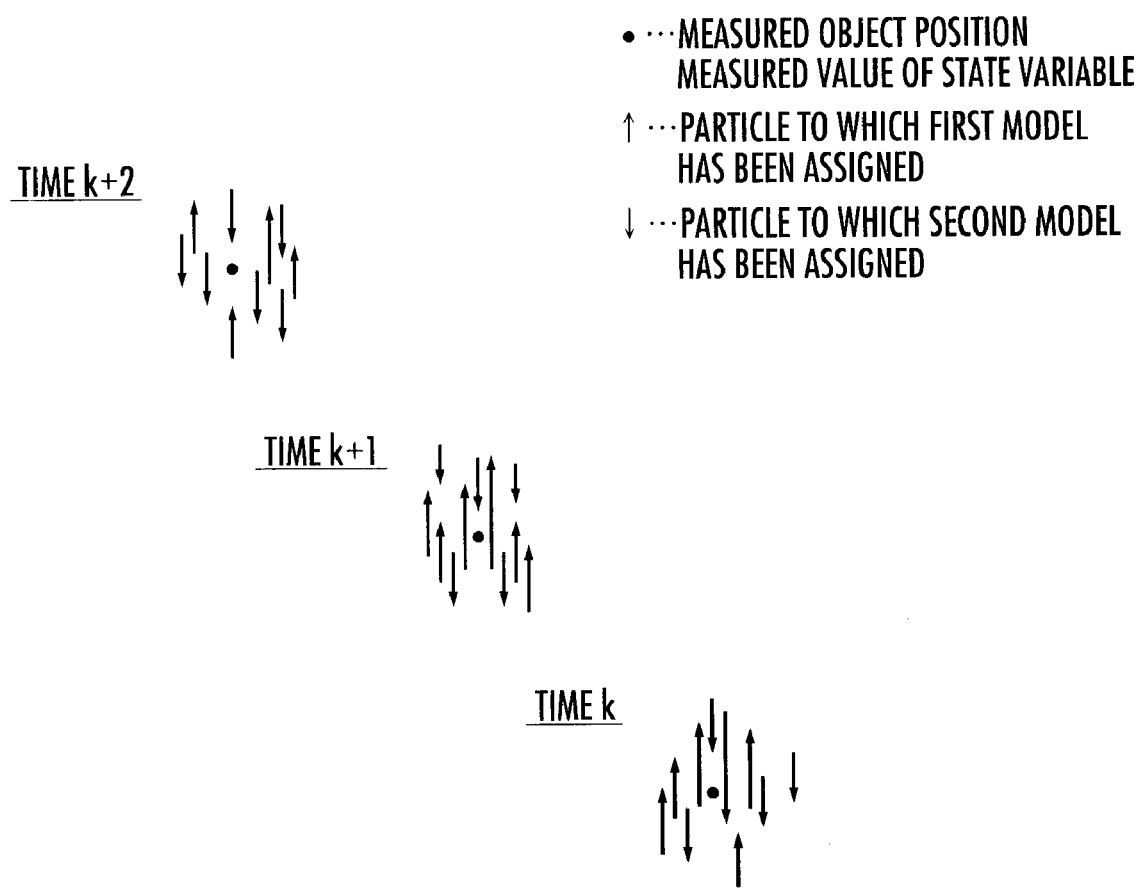
FIG. 5 is a second graphical illustration related to the process for producing a particle filter.

Further, as illustrated in FIG. 5, the first-class particles denoted by upward arrows and the second-class particles denoted by downward arrows are dispersed and arranged around measured values denoted by black dots of state variables. The state variable space is a space defined by a second state variable. If the second state variable is scalar, then the state variable space is defined as a one-dimensional space, and if the second state variable is an n-dimensional vector (n=2, 3, . . . ), then the state variable space is defined as an n-dimensional space. The object position x (k) as the second state variable, which is the object to be estimated, is scalar; therefore, the state variable space is defined as a one-dimensional space.

Figure 6:
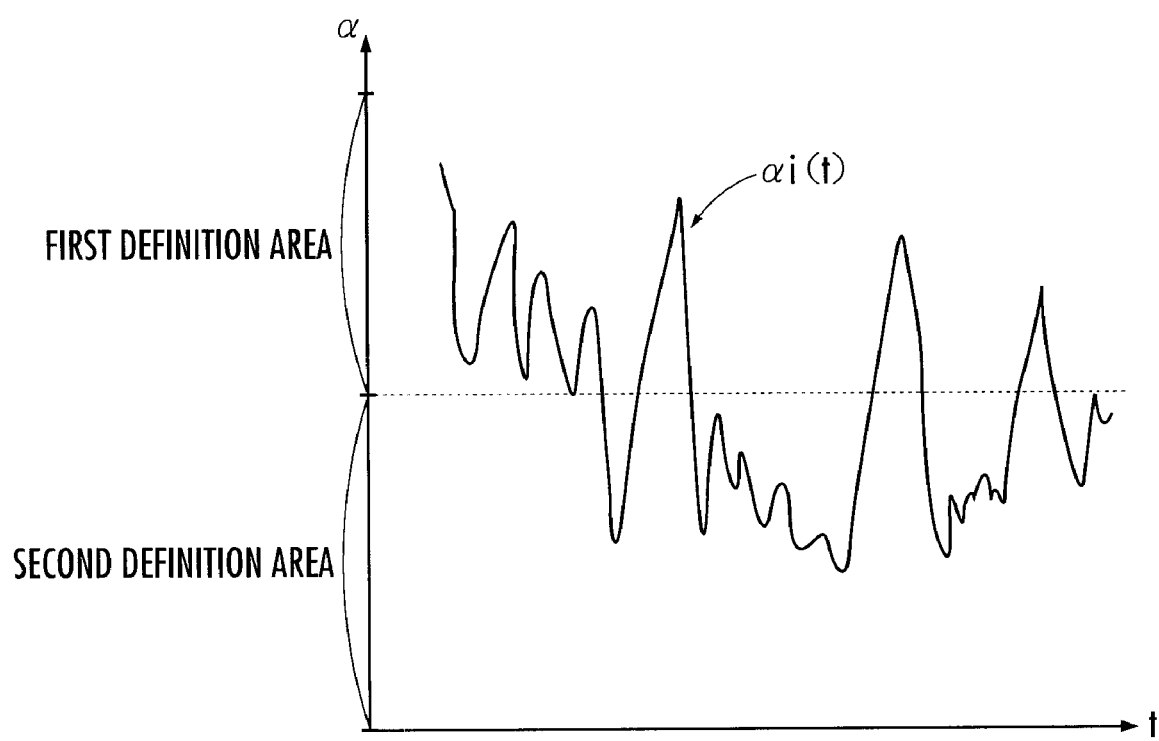
FIG. 6 is a graphical illustration related to model variables.

Each particle $y_i(k)$ has a model variable $\alpha_i(k)$, the value of which fluidly changes, as illustrated in FIG. 6. As will be discussed later, the changing mode of the model variable $\alpha_i(k)$ is adjusted by the second element 12. If the value of the model variable $\alpha_i(k)$ belongs to a first definition area, then the first model is assigned as the unique model to the particle $y_i(k)$. If the value of the model variable $\alpha_i(k)$ belongs to a second definition area, then the second model is assigned as the unique model to the particle $y_i(k)$.

Incidentally, the type of a selectable model may be different for each particle $y_i(k)$. For instance, one of the first model and the second model may be selected as the unique model for some particles, while one of the first model and a third model, which is different from the second model, may be selected as the unique model for the remaining particles.

Figure 4:
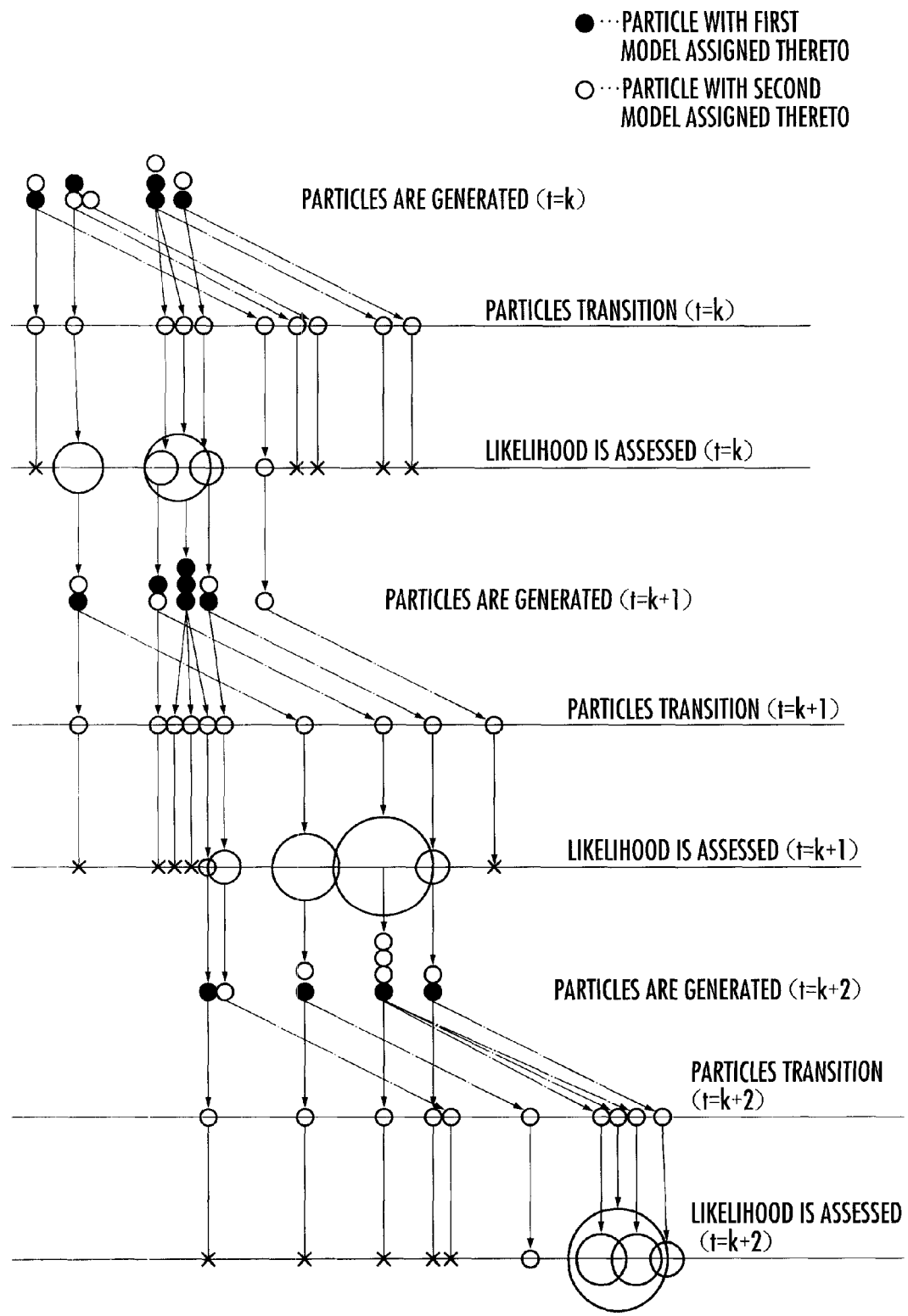
FIG. 4 is a first graphical illustration related to a process for producing a particle filter.

Further, each particle $y_i(k)$ is transferred in the state variable space by the first element 11 according to the unique model thereof (S006 in FIG. 2). Thus, the first-class particles indicated by black circles and the second-class particles indicated by white circles are transferred and arranged in the state variable space, as illustrated in FIG. 4.

Further, likelihood $p_i(k)=p(y_i(k)|x(k))$ of each particle $y_i(k)$ relative to the object position x(k) measured by the first element 11 is assessed (S008 in FIG. 2). Thus, the likelihoods $p_i(k)$ are calculated, the levels of which are represented by the magnitudes of the diameters of the particles in FIG. 4.

Then, the first element 11 estimates, as the object L position x(k), a weighted mean value $\Sigma_i p_i(k) \cdot y_i(k)/\Sigma_i y_i(k)$ of each particle $y_i(k)$ using the likelihood $p_i(k)$ as the weight (S010 in FIG. 2). Alternatively, a particle $y_i(k)$ whose likelihood $p_i(k)$ becomes a maximum or the mean value of particles $y_i(k)$ or a weighed means value or the like using the likelihood p(k as the weight whose likelihoods $p_i(k)$ are within predetermined high ranks may be estimated as the object position x(k).

Further, based on the likelihood (or the probability density distribution) $p_i(k)$ of each particle discretely expressed relative to the object position x(k) at time k, the second element 12 determines whether each particle $y_i(k)$ should be allowed to remain or should be extinguished or split up (S012 in FIG. 2). Thus, particles with higher likelihood $p_i(k)$ preferentially remain or increase, while particles with lower likelihood $p_i(k)$ are preferentially extinguished.

Thereafter, based on the unique model, i.e., the current model, assigned to each remaining particle $y_i(k)$, the second element 12 determines a new unique model, i.e., the next model (S014 in FIG. 2).

To be specific, a current model variable value $\alpha_1(k)$ unique to each particle $y_i(k)$ is increased or decreased by a perturbation amount $\delta_i(k)$ thereby to determine the next model variable value $\alpha_1(k+1)$. If the next model variable value $\alpha_1(k+1)$ belongs to the first definition area, then the first model will be determined as the next unique model. Similarly, if the next model variable value $\alpha_1(k+1)$ belongs to the second definition area, then the second model will be determined as the next unique model. The perturbation amount $\delta_i(k)$ is adjusted so as to fall within a permissible range.

Subsequently, it is determined whether the processing of estimating the object position x(k) has been terminated (S016 in FIG. 2). If it is determined that the estimation processing has not been terminated (NO in S016 in FIG. 2), then the index k is incremented by 1 (S017 in FIG. 2), and then the aforesaid series of processing, such as the measurement of the object position x(k) and the assessment of the likelihood $p_i(k)$, is repeated (refer to S002 to S016 in FIG. 2).

According to the state estimating apparatus 1, which exhibits the functions described above, to estimate the state of an object, (1) each particle transitions to the current position according to a current model unique thereto and (2) the likelihood $p_i(k)$ of each particle relative to the current measured value x(k) of the first state variable is assessed in the state variable space defined by the second state variable.

Hence, the arithmetic processing load on the state estimating apparatus 1 required for the estimation of an object is reduced, as compared with a case where (1') each particle transitions according to each of the plurality of models, and (2') the likelihood $p_i(k)$ of each particle relative to the measured value x(k) of the first state variable is assessed.

Further, particles with lower likelihood $p_i(k)$ are preferentially extinguished, while particles with higher likelihood $p_i(k)$ preferentially remain or increase (refer to S012 in FIG. 2). Therefore, the particles which have transitioned in the state variable space according to a state transition model having high probability of following an object (high-likelihood model) tend to gradually increase. For example, as illustrated in FIG. 4 and FIG. 5, respectively, the particles denoted by black circles or upward arrows having the first model gradually increase from time k+1 to time k+2 as the high-likelihood model transition from time k to time k+1.

Further, the next models are determined on the basis of the current models unique to individual particles (refer to S014 in FIG. 2). Hence, particles which transition in the state variable space by using the high-likelihood models as their next models tend to increase (refer to FIG. 5).

On the other hand, since the models fluidly change, there is an allowance for a model which is different from the current model to be determined as the next model, while the current model remaining the basic model (refer to FIG. 6).

Thus, although in a small quantity, there are particles using models which are different from the high-likelihood models (the low-likelihood models) as the models unique thereto in order to provide a brake against the increase of the particles having high-likelihood models as the models unique thereto. For instance, as illustrated in FIG. 4 and FIG. 5, respectively, the particles having the first model, which is the high-likelihood model (denoted by the black circles or the upward arrows), gradually increase during transition from time k to time k+1, and time k+1 to time k+2, while at the same time, the particles having the second model, which is the low-likelihood model (denoted by the white circles and the downward arrows), also exist. Thus, even if the object starts state transition according to a model which is different from a previous model, the state that is represented by the estimated value of a state variable of the object can be estimated with high accuracy by flexibly responding to the change of the model by changing a past low-likelihood model to a future high-likelihood model. This means that the state of the object can be efficiently estimated with high accuracy.

Further, a next value is adjusted such that the perturbation amount $\delta_1(k)$ from the current value $\alpha_1(k)$ of a model variable to the next value $\alpha_1(k+1)$ falls within a permissible range, and the next model unique to a particle is determined according to a region to which the next value $\alpha_i(k+1)$ belongs (refer to S014 in FIG. 2 and FIG. 6). Perturbating the model variable value $\alpha_i(k)$ allows a current model to be determined so that a previous model unique to a particle that has remained by controlling the perturbation amount $\delta_i(k)$ thereof to a permissible range is inherited to a certain extent, while leaving an allowance for a different model from the previous model to be determined as the current model. This arrangement makes it possible to estimate the state of the object with high accuracy while respecting the situation in which the probability of the object changing the state thereof by following the high-likelihood model.

As the first state variable and the second state variable, a velocity, acceleration, or the combination of a velocity and acceleration may be estimated in place of the position of an object. Further, the first state variable and the second state variable may differ from each other. In addition, a variety of models may be adopted as the first model and the second model. For example, a model which defines a behavior mode of an object in a state wherein a frictional force or a binding force is acting on the object may be adopted as the first model, while a model which defines the behavior mode of the object in a state wherein neither frictional force nor binding force is acting on the object may be adopted as the second model.

Moreover, the first element 11 may estimate, as a previous state transition model of an object, a current model unique to a particle whose likelihood $p_i(k)$ becomes a maximum or a current model common to particles whose total sum $\Sigma_i p_i(k)$ of the likelihood $p_i(k)$ becomes a maximum.

What is claimed is:

1. A state estimating apparatus comprising:
a first processor element configured to: measure a value of a first state variable indicative of a state of an object; disperse at least some particles among a plurality of particles around previous positions in a state variable space defined by a second state variable; transit each of the plurality of particles to a current position according to one current model selected from a plurality of models, such that a plurality of particle groups which each include particles having a common current model are formed, wherein the current model common to the particles within each of said plurality of particle groups is a unique current model for that particle group which fluidly changes for each particle within said particle group; assess a likelihood of each particle relative to a current measured value of the first state variable; and estimate a current state of the object on the basis of the likelihood; and
a second processor element configured to: allow particles from among the plurality of particles which have been assessed by the first processor element to have a likelihood greater than a predetermined high-likelihood threshold to remain or increase; extinguish particles from among the plurality of particles which have been assessed by the first processor element to have a likelihood less than a predetermined low-likelihood threshold, said low-likelihood threshold being equal to or less than the high-likelihood threshold; and then determine a next model from the plurality of models for each particle on the basis of the current model for each particle.

2. The state estimating apparatus according to claim 1, wherein
the second processor element is configured to determine a current model for each particle according to one region to which a current value of a model variable, which is unique to each particle and which fluidly changes, belongs among a plurality of regions defined in correspondence with each of the plurality of models.

3. The state estimating apparatus according to claim 2, wherein
the second processor element is configured to change a next value such that a perturbation amount from a current value to a next value of the model variable falls within a permissible range, and to determine a next model from among the plurality of models for each particle according to a region to which the next value belongs.

4. The state estimating apparatus according to claim 1, wherein
the first processor element is configured to estimate a previous state transition model of the object as the current model common to one of the particle groups whose total sum of the likelihoods is greater than that of all other particle groups.

5. The state estimating apparatus according to claim 1, wherein
the first processor element is configured to estimate a weighted mean value, which uses the likelihood of the current position of each particle as the weight, as a current value of the second state variable of the object.

6. A state estimating program recorded on a non-transitory computer-readable medium, the state estimating program configured to cause a computer to function as a state estimating apparatus, the state estimating apparatus comprising:
a first element which measures a value of a first state variable indicative of a state of an object, disperses at least some particles among a plurality of particles around previous positions in a state variable space defined by a second state variable, transits each of the plurality of particles to a current position according to a one current model selected from a plurality of models, such that a plurality of particle groups which each include particles having a common current model are formed, and each of said plurality of particle groups have a unique current model which fluidly changes for each particle within said particle group, assesses a likelihood of each particle relative to a current measured value of the first state variable, and estimates a current state of the object on the basis of the likelihood; and
a second element which allows particles from among the plurality of particles which have been assessed by the first element to have a likelihood greater than a predetermined high-likelihood threshold to remain or increase, and extinguishes particles which have been assessed by the first element to have a likelihood less than a predetermined low-likelihood threshold, and then determines a next model from the plurality of models each particle on the basis of the current model from the plurality of models each particle.

* * * * *